United States Patent [19]

Youngquist et al.

[11] 4,344,969

[45] Aug. 17, 1982

[54] SINGLE-DOUGH COOKIES HAVING STORAGE STABLE TEXTURE

[75] Inventors: Rudolph W. Youngquist; William J. Brabbs, both of Springfield Township, Hamilton County, Ohio

[73] Assignee: The Procter & Gamble Company, Cincinnati, Ohio

[21] Appl. No.: 220,603

[22] Filed: Dec. 29, 1980

[51] Int. Cl.³ .................. A21D 2/00; A21D 8/02; A21D 10/00; A23L 1/10

[52] U.S. Cl. .................................. 426/18; 426/61; 426/64; 426/549

[58] Field of Search ............... 426/18, 61, 549, 558, 426/496, 523, 64

[56] References Cited

U.S. PATENT DOCUMENTS

| | | | |
|---|---|---|---|
| 3,026,205 | 3/1962 | Stone | 426/61 |
| 3,198,637 | 8/1965 | Harris | 99/86 |
| 3,250,625 | 5/1966 | Thelen | 99/86 |
| 3,250,626 | 5/1966 | Thelen | 99/86 |
| 4,137,336 | 1/1979 | Radlove | 426/555 |

FOREIGN PATENT DOCUMENTS 2511847 9/1976 Fed. Rep. of Germany .

OTHER PUBLICATIONS

Reed, Gerald; *Enzymes in Food Processing*, 2nd Ed., Academic Press, 1975, p. 316.

*Primary Examiner*—Raymond N. Jones
*Assistant Examiner*—Elizabeth J. Curtin
*Attorney, Agent, or Firm*—Michael J. Roth; Eric W. Guttag; Richard C. Witte

[57] ABSTRACT

Incorporation of a carbohydrase into cookie dough provides, via a special baking process, a cookie having a storage stable texture which emulates that of freshly baked, home-style, drop-type cookies. The process for making these cookies involves (1) retarding enzyme activity in the finished dough before baking; (2) deactivating the enzyme in a portion of the cookie, preferably the surface; (3) activating the remainder of the enzyme; (4) allowing the remaining active enzyme to operate on the carbohydrates in the cookie; and (5) final baking.

7 Claims, No Drawings

SINGLE-DOUGH COOKIES HAVING STORAGE STABLE TEXTURE

TECHNICAL FIELD

Fresh, home-baked cookies are the standard of excellence in the cookie world. The dominant characteristic of most fresh, home-baked cookies is their texture, specifically, a crisp, friable exterior surface and a ductile interior. The interior contains pockets of supersaturated sugar solution (syrup) which are ductile and are sometimes visible as strands when the cookie is pulled apart. Unfortunately, within a few weeks, or less, such cookies undergo a spontaneous and irreversible process of degradation, becoming hard and crumbly throughout. The following describes the physicochemical processes which have now been discovered to occur during cookie baking and subsequent storage.

Prior to baking, a cookie dough consists of a hydrated mixture of flour, shortening (fat), sugar, and minor adjunct ingredients. During baking, sugar and water appear to be the prime "interactants." The flour (starch and protein) is of less importance because it does not hold water, relative to the sugar, at oven temperature.

When the cookie dough enters the oven, the water in the dough is saturated with sugar and appears to be evenly distributed throughout the dough. As the water temperature increases during baking, the solubility of the sugar increases, drawing water away from the flour. At about 70° C. all the water present has the capacity to dissolve all the sugar, as indicated by the fact that the x-ray diffraction pattern for crystalline sugar is lost. As the cookie temperature continues to increase (80° C.), a non-saturated sugar solution is formed from which the water is free to evaporate. At this point, water is rapidly lost to the atmosphere until the solution is again saturated (0.18 gram water/gram sugar). This occurs typically after about eight minutes of baking. If baking is continued, typically to the twelve minute point, the dehydration continues and a dry (0.1 gram water/gram sugar) crunchy cookie is produced, containing amorphous sugar that cannot crystallize because its water content is too low.

When a typical (eight minute) cookie is removed from the oven (100°–105° C.), most of the water is held as the hot saturated sucrose syrup. Upon cooling, this syrup becomes super-saturated, holding the water within the cookie. It is this wet syrup that gives the cookie its fresh, chewy eating quality. During the subsequent 24 hours, the sugar begins to crystallize spontaneously, releasing water from the syrup to produce a temporary increase in interior water activity ($a_w$). This released water migrates toward the moisture-depleted outer surface. During the first one to six days after baking, moisture continues to equilibrate throughout the cookie, transferring through the starch matrix. As the $a_w$ reaches about 0.6, the sugar is almost fully crystallized and the starch is tactile by dry. As time goes on, cross-sectional equilibrium is essentially reached. Unlike bread staling, these latter changes in a cookie cannot be reversed by heating, indicating that the starch in the cookie is not undergoing class retrogradation.

Cookie texture can be quantified, as described in the U.S. Pat. application of Hong and Brabbs, Ser. No. 220,643, filed Dec. 29, 1980, which is hereby incorporated by reference, in terms of stiffness, a measure of stress vs deformation, and plasticity, a measure of the tendency of the cookie crumb to plastic flow. The typical freshly baked homemade cookie has regions of high stiffness/low plasticity (crisp) and regions of low stiffness/high plasticity (chewy). As described above, the differences between these regions degrade with time, so that the cookies acquire a uniform texture perceived by consumers as uninteresting and somewhat undesirable.

It would be of value, therefore, to provide cookies which, having reached substantial textural equilibrium, would still demonstrate strong differences between regions having the maximum stiffness:plasticity ratios (crisp) and those regions having the minimum stiffness:plasticity ratios. This difference, best expressed as $$\log \max \frac{\text{stiffness}}{\text{plasticity}} - \log \min \frac{\text{stiffness}}{\text{plasticity}}$$

should be substantial, i.e. a log difference of at least about 1.75, so that it is perceivable by consumers, and storage stable, so that it is suitable for production in a commercial manufacturing-marketing milieu.

Currently, nearly all feasible cookie formulations which get crisp on the outside will eventually reach that same degree of crispness throughout, reverting, by water loss and sugar crystallization, to the dry, hard texture characteristic of popular ready-to-serve (RTS) cookies. Most home recipe cookies will reach this totally crisp state within one or two weeks, regardless of the temperature or relative humidity at which they are stored, since the changes involved in cookie hardening are internal to the cookie and are thus independent of the cookie's external environment. Most RTS cookies are simply baked out to a crisp end point immediately to facilitate subsequent handling.

Cookies can be formulated to be soft and moist by high shortening and/or high water formulas. However, these cookies have only limited microbial stability, do not stay crisp on the outside, or present major problems of stickiness or crumbliness.

It is also known that sugar (sucrose) crystallization can be inhibited by the addition of fructose, which results in soft, non-hardening cookies. But fructose also renders the cookie crust soft, eliminating the desired crunchy/chewy mouth texture dichotomy. Thus, fructose alone does not yield a stable cookie with the texture variability typical of freshly baked cookies.

Another approach taken within the cookie industry has been to supply a moistness impression by using coatings and/or fillings, e.g., fig bars. However, such techniques are clearly inapplicable in the case of the classic drop-type home recipe cookies, such as chocolate chip, peanut butter, oatmeal and sugar cookies and similar cookies which have a substantially homogeneous cross-section with respect to flavor and appearance.

Yet another approach taken is that described by Hong and Brabbs in their U.S. patent application 107,229, filed Dec. 26, 1979. That application describes the formation of laminated dough structures by surrounding a dough containing fructose or other crystallization resistant sugar with a layer of conventional sucrose- or other readily crystallizable sugar-containing cookie dough. The laminated dough structure so formed can be baked to a cookie which is desirably crisp and dry on the outside, but which remains moist and compressible internally. However, such a process involves separate process streams to prepare two separate cookie doughs, as well as elaborate processing to provide for proper lamination of the two doughs, which requires additional time and additional equipment.

It is an object of this invention to provide a dough and a process for making a cookie which has a storage stable texture diversity.

It is another object of this invention to provide a process for makikng a cookie which achieves the foregoing benefits without the need for lamination of doughs.

It is an object of this invention to provide a process for baking a carbohydrase-containing cookie dough in such a manner as to provide a storage stable texture in the finished product which emulates the texture of fresh, home-baked cookies.

These and other objects of the invention will become apparent in light of the following disclosure.

BACKGROUND ART

The use of fructose, present in invert sugars and honey, in the making of cookies is widely known among those with cooking and baking experience. In addition, fructose nominally is about 1.4 times as sweet as sucrose, and has therefore been incorporated in so called "dietetic" baking recipes. See, for example, U.S. Pat. No. 4,137,336, S. B. Radlove, issued Jan. 30, 1979.

Layered cookies are well-known. For example, Oreo TM -type filled cookies are sandwich-structured. Similarly, fig bars involve a center-filled structure in which the center portion of the cookie is of an entirely different composition than the outer shell. These cookies differ, not only in structure, but also in flavor and appearance, from the unitary cookies of the present invention.

U.S. Pat. Nos. 3,250,625 and 3,250,626, issued May 10, 1966 to Ray J. Thelen, describe cooked, leavened food laminates, of the type and texture characteristic of raised dough products such as breads, rolls, cakes, and the like. One of the materials laminated in the Thelen patents contains low levels of honey, while the others contain sucrose.

U.S. Pat. No. 3,198,367, issued Aug. 3, 1965, to M. C. Harris et al., describes the preparation of filled baked products and the filler composition used therein.

West German Offenlegungshrift No. 2,511,847, published Sept. 23, 1976 and assigned to Zukerfabrick Franken GMBH describes a method for preserving the freshness of bakery goods that contain sucrose and have a long shelf life. The process involves the inoculation or immersion of baked goods with or in an enzyme solution.

DISCLOSURE OF THE INVENTION

This invention provides a process for making a crumb-continuous cookie, or the like, having a storage-stable plurality of textures, comprising the steps of:
  (1) preparing a cookie dough comprising
  (a) a carbohydrase enzyme, and
  (b) a readily crystallizable sucrose-containing carbohydrate component, at least a part of the carbohydrate component being a substrate for the enzyme, in amounts sufficient, after the enzyme has acted on the substrate, to produce sufficient quantities of nonsucrose sugars to inhibit the crystallization of the sucrose; and
  (c) the balance comprising typical non-carbohyrate cookie ingredients;
  (2) retarding enzyme activity in the dough prior to baking;
  (3) forming the dough into a cookie preform for baking;
  (4) deactivating the enzyme in a portion of the preform;
  (5) activating the remainder of the enzyme;
  (6) allowing the remaining active enzyme to operate on the carbohydrate in the preform; and
  (7) baking the cookie preform to form a cookie.

The objective is to convert sugars and/or starches in the areas where the enzyme is active into mixtures which are noncrystallizing or crystallization resistant, while preserving the crystallization behavior of sucrose in those areas where the enzyme is inactive. The resulting dough and subsequent crumb areas will have storage stable chewy and crisp textures, respectively.

It follows, then, that the enzyme and substrate must be present in such amounts that, when the active enzyme has exerted its activity upon the substrate to the degree permitted by the preparation/baking process, sufficient amounts of non-sucrose sugars are produced to inhibit sucrose crystallization.

By "storage-stable" is meant that the cookies produced by the practice of this invention, after reaching substantial textural equilibrium, retain a plurality of textures for extended periods. Depending upon their formulation, cookies prepared by the practice of this invention will, after reaching textural equilibrium, retain their original texture for periods ranging from weeks, at a minimum, to many months, or even indefinitely, with proper packaging and maintenance of package integrity. This is to be distinguished from those cookies which lose their texture differences over a period of up to several weeks, even when stored in air- and moisture-tight containers. It is also to be distinguished from those cookies which are baked to a single texture in production, and are either continuously hard or continuously soft from baking through storage.

By "substantial textural equilibrium" is meant the point at which those physico-chemical and structural features responsible for texture, and those physico-chemical and structural processes responsible for changes in texture have reached an approximately steady state relative to the expected usable life and storage conditions of the product. In all instances, slow, long-term processes and texture changes which extend well beyond the maximum usable life of the cookie are ignored.

By "typical non-carbohydrate cookie ingredients" is meant those non-carbohydrate ingredients common to virtually all cookies, namely, water and shortening, as well as those additional flavoring and texturing ingredients desired in the particular system being formulated. Such latter ingredients would include nutmeats, cereals, raisins, and chocolate chips, as well as egg, vanilla, cinnamon, cocoa, and the numerous other similar materials commonly found in cookies, as desired. It also includes the non-carbohydrate portion of carbohydrate-containing materials used in cookies, such as the protein portion of flour.

By "plurality of textures" is meant that cookies prepared by the practice of this invention have the crisp/chewy texture dichotomy typical of freshly baked homemade cookies.

By "readily crystallizable sucrose-containing carbohydrate component" is meant sucrose, and readily crystallizable mixtures of sucrose with other monosaccharides, disaccharides and polysaccharides. By readily crystallizable is meant that the sugars will readily and spontaneously crystallize at the water content and water activity conditions encountered in semi-moist cookies of the home baked type. Typical $a_w$'s are in the range of from 0.3 to 0.8. The term "water activity" is used herein in its usual context to mean to ratio of the fugacity of water in the system being studied (f) to the fugacity of pure water at the same temperature.

In light of the foregoing, it will be understood that if non-sucrose sugars comprise a part of the carbohydrate component, they must be present at levels which do not significantly inhibit the crystallization of the sucrose part of the carbohydrate component.

"Monosaccharides" and "disaccharides" as used herein are compounds well known to the art.

"Polysaccharides" are polymers of monosaccharides, the most common polysaccharides being gums, cellulose, and starches.

Starch occurs in two forms, alpha-amylose and amylopectin. Both are glucose polymers. Amylose consists of long straight chains of glucose units joined by a 1,4-glycosidic linkage. Amylopectin is highly branched; the average length of the branches is from 24 to 30 glucose residues, depending on the species.

By "baking" herein is meant radiant, conductive, or convective exposure to energy of a type which imparts thermal energy to the products being baked. It thus includes conventional, convection and microwave oven baking.

By "carbohydrase enzyme" is meant those enzymes which operate on disaccharides or starches to produce non-sucrose (i.e., non-crystallizing) mono- or disaccharides.

All percentages herein are by weight, unless otherwise indicated.

DESCRIPTION OF A PREFERRED EMBODIMENT

One specific way this invention can be practiced is by preparing a typical, sucrose-containing cookie dough from common cookie ingredients, to which is added from about 5% to about 10% by weight of an invertase solution containing 30,000 Sumner units of invertase per ml. The enzyme is added at a pH of 8.4, using a bicarbonate/carbonate buffer system. Under these conditions, the enzyme is inactive. The enzyme can then be activated by oven heat. This is done by including the leavening acid sodium aluminum phosphate in the system, creamed into the shortening in the cookie dough with the sugar. Oven heat will then free the acid by melting the fat, and the heat will allow the leavening acid to react with the carbonate buffer, previously added with the enzyme. This reaction reduces the pH at the center of the cookie to about 6.0, so the enzyme can act. Under normal baking conditions, the timing of enzyme activation is critical because the enzyme present on the surface of the cookie must first be inactivated. Once this occurs, the neutralization of the cookie system to pH 6.0 activates the enzyme which functions only in the cookie interior, because the surface enzyme has been inactivated. The active enzyme, by inverting the sucrose, duplicates in situ the properties of the Hong-Brabbs laminate cookie, and allows the cookie to duplicate in storage-stable manner the crisp/chewy texture variations found in a typical homemade drop cookie.

The foregoing enzyme effect can be preferably exaggerated by manipulating the oven baking conditions. In a preferred execution of the baking process, the cookies are first baked at 190° C. (375° F.) for 5 minutes to inactivate surface enzyme and start the initial activation of the enzyme in the center of the cookie. The cookies are then held for 30 to 60 minutes at 60° C. (140° F.) which gives sufficient time for the enzyme to invert sufficient sucrose in the center of the cookie to produce a non-crystallizing mixture of sugars. The cookies are then baked out for 3 to 4 minutes at a temperature of 190° C. (375° F.).

By analysis, a cookie prepared by the foregoing process showed that less than 10% of the sucrose in the crust of the cookie had been converted to invert sugar, whereas over 30% of the sucrose in the center of the cookie had been converted. The water activity of the final baked cookie was in the range of from about 0.35 to about 0.55.

INDUSTRIAL APPLICABILITY

While the foregoing describes a preferred embodiment of this invention, it will be appreciated that the critical sequence of events provided by the process of this invention can be accomplished by many different methods. Manipulation of pH and oven heat have been discussed above. The manipulation of water activity and temperature can also provide means for activating and inactivating enzyme in selected portions of the cookie at selected points in time. For example, keeping the dough system cold prior to placing it in the oven prevents the enzyme from acting during dough mixing. Flash drying of the surface in the oven would cause immediate dehydration and prevent enzyme activity on the surface of the cookie and slow heating of the center (or frozen center) of the cookie will allow enzyme action. Encapsulation of the enzyme and/or sugar, combined with heat sensitive or pH sensitive decapsulation, is another approach to the same process.

The foregoing description discussed only the use of invertase as a means of producing sugars which inhibit sucrose crystallization. Other enzymes can also produce sugars that inhibit sucrose crystallization. For example, amylases and starch and, optionally, glucosidases can be added to the system and manipulated in a similar fashion to produce glucose and maltose which also inhibit crystallization of sucrose. A variety of other carbohydrases and their substrates can also be used in this process, and the sugars released will generally all retard sucrose crystallization.

It will be appreciated, of course, that higher and lower levels of carbohyrates and/or enzyme can be employed, depending on the level of conversion desired, so long as the carbohydrate conversion is sufficient to render the sucrose non-crystallizing in those areas of the cookie where the enzyme is active.

It will also be appreciated that the regions of active and inactive enzyme which are selected need not be limited to center and surface, respectively. In particular, it has been discovered that the consumer perception of texture and freshness in cookies has only a limited relationship to the spatial orientation of the texture regions. Thus, the regions of activation and inactivation may be arranged in other patterns, or distributed in ways that facilitate manufacture, as desired.

Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the ratio of sugar/flour/water/shortening.

In general, any cookie recipe which produces an organoleptically acceptable crumb-continuous cookie (as opposed to filled, iced and sandwich-type cookies) can be employed in the practice of the present invention. Some such recipes will incorporate additional ingredients. For example, oatmeal cookies generally contain rolled oats to provide their characteristic flavor and texture. Peanut butter cookies will, of course, contain peanut butter, which provides not only the distinctive flavor of peanut butter, but also oils (shortening) and peanut solids which supply both carbohydrates and proteins, similar to flour. Within limits, well known to the art, materials which "interrupt" the homogeneous composition of the typical cookie can be introduced into the formulation. These materials are essentially inert, so far as the chemistry of the cookie dough is concerned. Examples of such materials are chopped nuts, chocolate chips or Toll House TM morsels, coconut, butterscotch chips, oatmeal, peanut butter chips, raisins, and the like. Even in simple cookies, such as sugar cookies, it may be desirable to incorporate additional flavoring materials, such as spices.

In general, formulation and fabrication techniques can be highly variable, at the discretion of the manufacturer, depending upon the type of cookies produced, manufacturing and baking equipment used, price and availability of raw materials, etc. However, cookies of this invention will all be characterized in being prepared by the above described critical sequence steps, and the resulting cookies will be characterized in having a storage-stable plurality of textures, describable and "crisp" and "chewy". These textures can be quantified by the instrumental techniques described in the Hong and Brabbs patent application hereinbefore mentioned.

The following examples illustrate the broad range of industrial applicability of the present invention, without intending to be limiting thereof. It will be appreciated that other modifications of the present invention, within the skill of those in the baking arts, can be undertaken without departing from the spirit and scope of this invention.

EXAMPLE 1

Two batches of cookie dough were prepared:

| Batch A | |
| --- | --- |
| Crisco TM hydrogenated vegetable shortening | 50 gm |
| Sucrose, white | 37.5 gm |
| Brown sugar | 37.5 gm |
| Egg yolk | ½ yolk |
| Vanilla extract | 1 ml |
| Gold Medal TM flour | 62 gms |
| Salt | 1 gm |
| Egg white solids | 1.5 gm |
| Invertase solution, 24.2%, 30 units/mg | 18 ml |
| Chocolate chips | 85 gms |

The shortening was mixed with the sugars and then blended with the egg yolk and vanilla. The flour, egg white solids, and salt were mixed together and then mixed with the sugar/shortening mixture. To this was added the invertase and the entire dough was mixed thoroughly in a Hobart mixer. Afterward, the chocolate chips were gently combined with the dough.

Batch B was the same as Batch A except that 18 mls water were substituted for the invertase solution.

Both batches were formed into cookie dough preforms and baked according to the following schedule.

190° C. (375° F.) for 3 minutes
60° C. (140° F.) for 60 minutes
190° C. (375° F.) for 6 minutes After 3 days, the Batch A cookies were equal to freshly baked, while the Batch B cookies were very stale and hard.

EXAMPLE 2

Sugar cookies were prepared from the following formula:

| | |
| --- | --- |
| Flour | 248 gms |
| Na$_2$CO$_3$ | 1.68 gms |
| Salt | 4 gms |
| Egg white solids | 6 gms |
| White sucrose | 150 gms |
| Brown sugar | 150 gms |
| Sodium aluminum phosphate | 7.7 gms |
| Crisco TM | 200 gms |
| Egg yolks | 2 |
| Vanilla extract | 4 gms |
| Water | q.s. (20.2 mls) |
| Enzyme solution: | |
| 40 ml H$_2$O | |
| 7.4 gm NaHCO$_3$ | |
| .98 gm Na$_2$CO$_3$ | |
| 10 mls Fermvertase TM base | |
| | 27 ml |

The flour, Na$_2$CO$_3$, salt, and egg white solids were blended together with the sugar and sodium aluminum phosphate. Into this mix was blended the Crisco TM shortening, followed by the egg yolks and vanilla. The water was added until the mixture was smooth, followed by the enzyme solution, and the resulting dough was formed into cookie preforms and baked according to the following schedule:

238° C. (460° F.) for 3 min
60° C. (140° F.) for 60 min
190° C. (375° F.) for 4.5 min During baking, pH of the dough dropped from about 8.4 to about 6.0, activating the enzyme in the cookie center where it was not denatured by the short, high temperature bake. After baking, optical rotation measurements showed 23% inversion of the sugars in the cookie center.

What is claimed is:

1. A cookie dough capable of providing, when baked, a crumb-continuous cookie having storage-stable crisp and chewy textures, comprising:
   (a) a carbohydrase enzyme;
   (b) a buffer system which provides an initial pH in the cookie dough sufficient to inactivate the enzyme;
   (c) a readily crystallizable sucrose-containing carbohydrate component, at least a part of the carbohydrate component being a substrate for the enzyme, in amounts sufficient, after the enzyme has acted on the substrate, to produce sufficient quantities of non-sucrose sugars to inhibit the crystallization of the sucrose; and
   (d) the balance comprising non-carbohydrate cookie ingredients;
   (e) the non-carbohydrate cookie ingredients including shortening having a leavening acid incorporated therein, the leavening acid being capable of reacting with the buffer system when the shortening is melted so as to provide a pH in a portion of the cookie dough sufficient to activate the enzyme.

2. A composition according to claim 1 wherein the carbohydrase enzyme is a member selected from the group consisting of invertase, glucosidase and amylase.

3. A process for making a crumb-continuous cookie having a storage-stable plurality of textures, comprising the steps of:

(1) preparing a cookie dough, comprising:
   (a) a carbohydrase enzyme;
   (b) a readily crystallizable sucrose-containing carbohydrate component, at least a part of the carbohydrate component being a substrate for the enzyme, in amounts sufficient, after the enzyme has acted on the substrate, to produce sufficient quantities of non-sucrose sugars to inhibit the crystallization of the sucrose; and
   (c) the balance comprising non-carbohydrate cookie ingredients;

(2) inactivating the enzyme in a portion of the cookie dough to preserve the crystallization behavior of the sucrose therein;

(3) activating the enzyme in the remaining portion of the cookie dough to produce sufficient quantities of non-sucrose sugars to inhibit the crystallization of the sucrose therein; the enzyme inactivated and activated portions of the cookie dough being capable, when baked, of forming a cookie having storage-stable crisp and chewy textures;

(4) baking the cookie dough to form a cookie having storage-stable crisp and chewy textures.

4. A process according to claim 3 wherein the enzyme is inactivated in the surface of the cookie dough and activated in the center of the cookie dough.

5. A process according to claim 4 wherein the enzyme is inactivated and activated by baking the cookie dough.

6. A process according to claim 3 comprising the further step of forming the cookie dough into a preform prior to baking.

7. A process according to claim 3 wherein the carbohydrase enzyme is selected from the group consisting of invertase, glucosidase and amylase.

* * * * *